US007703881B2

(12) United States Patent
Asada et al.

(10) Patent No.: US 7,703,881 B2
(45) Date of Patent: Apr. 27, 2010

(54) PRINT HEAD CLEANING MEMBER

(75) Inventors: Mitsuyasu Asada, Daito (JP); Kenichi Morinaga, Daito (JP); Daisuke Takasaka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 899 days.

(21) Appl. No.: 11/407,065

(22) Filed: Apr. 20, 2006

(65) Prior Publication Data

US 2006/0238562 A1 Oct. 26, 2006

(30) Foreign Application Priority Data

Apr. 25, 2005 (JP) ............................ 2005-126122

(51) Int. Cl.
*B41J 2/165* (2006.01)
*B41J 2/175* (2006.01)
*B41J 2/32* (2006.01)
*B41J 2/315* (2006.01)
*G01D 15/10* (2006.01)

(52) U.S. Cl. ............................ 347/33; 347/86; 347/171

(58) Field of Classification Search .................. 347/33, 347/171, 86
See application file for complete search history.

(56) References Cited

U.S. PATENT DOCUMENTS 4,644,370 A * 2/1987 Watanabe ................... 347/171
6,000,780 A * 12/1999 Schwiebert et al. ........... 347/33
2003/0227532 A1* 12/2003 Nitta et al. .................. 347/108
2004/0109715 A1 6/2004 Meier et al.

FOREIGN PATENT DOCUMENTS

| | | | | | |
|---|---|---|---|---|---|
| JP | 61-31279 | A | | 2/1986 | |
| JP | 61-164878 | A | | 7/1986 | |
| JP | 63222878 | A | * | 9/1988 | ................ 347/171 |
| JP | 10-6491 | A | | 1/1998 | |
| JP | 2000-141672 | A | | 5/2000 | |

OTHER PUBLICATIONS

Partial European Search Report dated Dec. 22, 2008 (four (4) pages).
European Search Report mailed Mar. 10, 2009.

* cited by examiner

*Primary Examiner*—Julian D Huffman
*Assistant Examiner*—Jason S Uhlenhake
(74) *Attorney, Agent, or Firm*—Crowell & Moring LLP

(57) ABSTRACT

A print head cleaning member allowing simplification of the structure and downsizing is obtained. This print head cleaning member comprises a spent ink cartridge and a cleaning component including a mounting portion of resin for mounting the cleaning component on the ink cartridge and a cleaning portion. The ink cartridge is used as a guide portion for bringing the cleaning component into contact with the print head.

17 Claims, 6 Drawing Sheets

PRINT HEAD CLEANING MEMBER

BACKGROUND OF THE INVENTION

1. Field of the Invention

The present invention relates to a print head cleaning member, and more particularly, it relates to a print head cleaning member comprising a cleaning component for cleaning a print head.

2. Description of the Background Art

A cleaning member disclosed in Japanese Patent Laying-Open No. 2000-141672 or 10-6491 (1998), for example, is generally known in relation to an image generating apparatus.

The aforementioned Japanese Patent Laying-Open No. 2000-141672 discloses a method of cleaning a head wiper for cleaning an ink nozzle (printing portion) with a head wiper cleaning plate mounted on an ink cartridge of an ink jet printer (image generating apparatus).

The aforementioned Japanese Patent Laying-Open No. 10-6491 discloses an ink jet recording apparatus (image generating apparatus) so formed as to clean the outer peripheral surface of a roller member provided on gap holding means keeping a printing medium and ink discharge means at a constant distance.

On the other hand, a thermal transfer printer employing a thermal head (print head) for printing is generally known as an exemplary image generating apparatus. In this conventional thermal transfer printer, the print head is cleaned with a cleaning member. FIG. 10 is a perspective view showing the overall structure of an exemplary conventional thermal transfer printer. FIG. 11 is a sectional view showing a printing state of the exemplary conventional thermal transfer printer. FIG. 12 is a perspective view for illustrating the overall structure of a print head cleaning component of the exemplary conventional thermal transfer printer. FIG. 13 is a sectional view showing a print head cleaning state of the exemplary conventional thermal transfer printer. The structures of the exemplary conventional thermal transfer printer and the cleaning component are now described with reference to FIGS. 10 to 13.

In the exemplary conventional thermal transfer printer, an ink cartridge 102 is inserted into an ink cartridge receiving hole 101*a* provided on a side portion of a printer body 101. An engaging member 103 is also provided on the side portion of the printer body 101 for fixing the ink cartridge 102 inserted into the ink cartridge receiving hole 101*a*. The ink cartridge 102 includes a pair of ink ribbon storage portions 102*a* and 102*b* each storing an ink ribbon (ink sheet) 109 (see FIG. 11), a pair of coupling portions 102*c* and 102*d* for coupling the pair of ink ribbon storage portions 102*a* and 102*b* with each other and a concave engaging portion 102*e* provided on the coupling portion 102*d* for engaging with the engaging member 103. The printer body 101 is provided therein with a thermal head (print head) 104 for printing, a platen roller 105 opposed to the thermal head 104, a feed roller 106 for carrying a paper 110 and a press roller 107 pressed against the feed roller 106 with prescribed pressing force, as shown in FIG. 11.

The thermal head 104 has a support shaft 104*a*, an arm 104*b* and a print head 104*c*. The thermal head 104 is mounted on the printer body 101 to be rotatable about the support shaft 104*a*.

FIG. 12 shows a cleaning component 108 employed for cleaning the print head 104*c* of the thermal head 104 in the exemplary conventional thermal transfer printer. This cleaning component 108 has a cleaning portion 108*a* of felt or the like and a pair of resin guide portions 108*b* and 108*c*.

A printing operation of the exemplary conventional thermal transfer printer is now described with reference to FIG. 11. The feed roller 106 rotates along arrow F2 in FIG. 11, thereby carrying the paper 110 in a paper carrying direction (along arrow E2 in FIG. 11). At this time, the ink ribbon storage portion 102*b* of the ink cartridge 102 feeds the ink ribbon 109. The thermal transfer printer presses the print head 104*c* against the platen roller 105 through the paper 110 and the ink ribbon 109 while carrying the paper 110 and the ink ribbon 109, thereby performing printing.

An operation of the exemplary conventional thermal transfer printer for cleaning the print head 104*c* is described with reference to FIGS. 12 and 13. In general, the print head 104*c* is cleaned with the cleaning component 108 shown in FIG. 12. More specifically, the cleaning component 108 is inserted into the ink cartridge receiving hole 101*a* provided on the side portion of the printer body 101 so that the pair of guide portions 108*b* and 180*c* of the cleaning component 108 function as guides for bringing the cleaning portion 108*a* into contact with the print head 104*c*, as shown in FIG. 13. Then, the cleaning component 108 is reciprocated along arrow D in FIG. 12 in the state shown in FIG. 13, thereby wiping off foreign matter adhering to the print head 104*c* with the cleaning portion 108*a*. The print head 104*d* is cleaned in this manner.

In the exemplary conventional thermal transfer printer shown in FIGS. 12 and 13, however, the cleaning component 108 for the print head 104*c* requires the pair of guide portions 108*b* and 108*c*, in order to bring the cleaning portion 108*a* into contact with the print head 104*c*. Consequently, the cleaning component 108 is disadvantageously complicated in structure and increased in size.

The head wiper cleaning plate disclosed in the aforementioned Japanese Patent Laying-Open No. 2000-141672, which is a member for cleaning the head wiper for cleaning the ink nozzle, must disadvantageously be provided independently of the head wiper cleaning the ink nozzle (printing portion). Therefore, the structure of a cleaning portion is complicated, and the number of components is increased.

The cleaning member disclosed in the aforementioned Japanese Patent Laying-Open No. 10-6491 is not a member cleaning a printing portion of the ink jet printer but a member for cleaning the outer peripheral surface of the roller member provided on the gap holding means keeping the printing medium and the ink discharge means at the constant distance. Therefore, the aforementioned Japanese Patent Laying-Open No. 10-6491 neither discloses nor suggests a member cleaning the printing portion.

SUMMARY OF THE INVENTION

The present invention has been proposed in order to solve the aforementioned problems, and an object of the present invention is to provide a print head cleaning member allowing simplification of the structure and downsizing.

In order to attain the aforementioned object, a print head cleaning member according to a first aspect of the present invention comprises a spent ink cartridge and a cleaning component mounted on the ink cartridge for cleaning a print head, and the ink cartridge is used as a guide portion for bringing the cleaning component into contact with the print head.

In the print head cleaning member according to the first aspect, as hereinabove described, the spent ink cartridge is so used as the guide portion for bringing the cleaning component into contact with the print head that no guide portion may be provided on the cleaning component, whereby the cleaning component can be simplified in structure and downsized. Further, the spent ink cartridge can be recycled through the use as the guide portion for the cleaning member, and the number of components can be reduced.

In the aforementioned print head cleaning member according to the first aspect, the cleaning component preferably includes a mounting portion for mounting the cleaning component on the ink cartridge and a cleaning portion mounted on the mounting portion for cleaning the print head by coming into contact with the print head. According to this structure, the mounting portion is provided independently of the cleaning portion made of felt or the like, whereby the cleaning portion can be easily mounted on the ink cartridge through the mounting portion.

In the aforementioned structure provided with the cleaning component including the mounting portion and the cleaning portion, a chamfer is preferably provided on at least an ink cartridge insertional end of a contact surface of the cleaning portion. According to this structure, the cleaning component can be smoothly brought into contact with the print head for cleaning the same.

In this case, the chamfer is preferably provided on each ink cartridge insertional end of the contact surface of the cleaning portion. According to this structure, both ink cartridge insertional ends of the contact surface of the cleaning portion can be inhibited from being caught on the print head when the cleaning member is inserted into or extracted from an image generating apparatus, whereby the contact surface of the cleaning portion can be more smoothly brought into contact with the print head.

In the aforementioned print head cleaning member according to the first aspect, the ink cartridge preferably includes a pair of ink sheet storage portions, a pair of coupling portions coupling the pair of ink sheet storage portions with each other and a recess portion provided on one of the pair of coupling portions closer to an ink cartridge insertional forward end and mounted with the cleaning component for locating the mounting position, and the cleaning component is preferably detachably mounted on the recess portion. According to this structure, the recess portion locating the mounting position of the cleaning component can suppress displacement of the mounting position. Further, the detachable cleaning component can be exchanged as a consumable part.

In the aforementioned structure provided with the cleaning component including the mounting portion and the cleaning portion, the mounting portion of the cleaning component preferably has a pair of side portions extending from both ends of the mounting portion perpendicularly to the surface of the mounting portion respectively, and hooked engaging portions are preferably provided on the forward ends of the pair of side portions respectively. According to this structure, the cleaning component can be easily mounted on the ink cartridge by engaging the hooked engaging portions provided on the forward ends of the side portions with the coupling portions of the ink cartridge.

In the aforementioned structure provided with the cleaning component including the mounting portion having the hooked engaging portions, the ink cartridge preferably includes a pair of ink sheet storage portions and a pair of coupling portions coupling the pair of ink sheet storage portions with each other, and the distance between opposite portions of the pair of hooked engaging portions is preferably smaller than the width of the coupling portion closer to the ink cartridge insertional forward end, and the hooked engaging portions are preferably rendered elastically deformable. According to this structure, the hooked engaging portions can be easily engaged with the coupling portions of the ink cartridge by elastically deforming the hooked engaging portions.

In the aforementioned structure provided with the cleaning component including the mounting portion having the side portions, the ink cartridge preferably includes a pair of ink sheet storage portions and a pair of coupling portions coupling the pair of ink sheet storage portions with each other, and the width of the coupling portion closer to the ink cartridge insertional forward end is preferably substantially identical to the distance between opposite inner side surfaces of both sides of the mounting portion. According to this structure, the cleaning component can be inhibited from jolting with respect to the ink cartridge in the short-side direction (cross direction) of the coupling portions.

In the aforementioned structure provided with the cleaning component including the mounting portion having the hooked engaging portions, the ink cartridge preferably includes a pair of ink sheet storage portions, a pair of coupling portions coupling the pair of ink sheet storage portions with each other and a recess portion provided on one of the pair of coupling portions closer to an ink cartridge insertional forward end and mounted with the cleaning component for locating the mounting position, and the thickness of the coupling portion closer to the ink cartridge insertional forward end in the range provided with the recess portion is preferably substantially identical to the distance between the pair of hooked engaging portions and the bottom surface of the mounting portion. According to this structure, the cleaning component can be inhibited from jolting with respect to the ink cartridge in the thickness direction of the coupling portions.

In the aforementioned structure provided with the recess portion provided on the coupling portion of the ink cartridge, the cleaning component preferably includes a mounting portion for mounting the cleaning component on the ink cartridge, and the longitudinal length of the recess portion of the coupling portion closer to the ink cartridge insertional forward end is preferably substantially identical to the longitudinal length of the mounting portion of the cleaning component in plan view. According to this structure, the cleaning component can be inhibited from displacement with respect to the ink cartridge in the longitudinal direction of the coupling portions.

In the aforementioned structure provided with the cleaning component including the mounting portion and the cleaning portion, the mounting portion of the cleaning component is preferably made of resin. According to this structure, the pair of hooked engaging portions of the mounting portions made of resin can be easily elastically deformed.

A print head cleaning member according to a second aspect of the present invention comprises a spent ink cartridge and a cleaning component for cleaning a print head, while the cleaning component includes a mounting portion for mounting the cleaning component on the ink cartridge and a cleaning portion mounted on the mounting portion for cleaning the print head by coming into contact with the print head, the ink cartridge is used as a guide portion for bringing the cleaning component into contact with the print head, a chamfer is provided on at least an ink cartridge insertional end of a contact surface of the cleaning portion, the ink cartridge includes a pair of ink sheet storage portions, a pair of coupling portions coupling the pair of ink sheet storage portions with each other and a recess portion provided on one of the pair of coupling portions closer to an ink cartridge insertional forward end and mounted with the cleaning component for locating the mounting position, and the cleaning component is detachably mounted on the recess portion.

In the print head cleaning member according to the second aspect, as hereinabove described, the spent ink cartridge is so used as the guide portion for bringing the cleaning component into contact with the print head that no guide portion may be provided on the cleaning component, whereby the cleaning component can be simplified in structure and downsized. Further, the spent ink cartridge can be recycled through the use as the guide portion for the cleaning member, and the number of components can be reduced. In addition, the cleaning component includes the mounting portion for mounting the same on the spent ink cartridge and the cleaning portion for cleaning the print head so that the mounting portion is provided independently of the cleaning portion made of felt or the like, whereby the cleaning portion can be easily mounted on the ink cartridge through the mounting portion. Further, the chamfer is so provided on at least the ink cartridge insertional end of the contact surface of the cleaning portion that the cleaning component can be smoothly brought into contact with the print head for cleaning the same. Further, the recess portion mounted with the cleaning component for locating the mounting position of the cleaning component can suppress displacement of the mounting position. Further, the cleaning component detachable from the recess portion of the ink cartridge can be exchanged as a consumable part.

In the aforementioned print head cleaning member according to the second aspect, the chamfer is preferably provided on each ink cartridge insertional end of the contact surface of the cleaning portion. According to this structure, both ink cartridge insertional ends of the contact surface of the cleaning portion can be inhibited from being caught on the print head when the cleaning member is inserted into or extracted from an image generating apparatus, whereby the contact surface of the cleaning portion can be more smoothly brought into contact with the print head.

In the aforementioned print head cleaning member according to the second aspect, the mounting portion of the cleaning component has a pair of side portions extending from both ends of the mounting portion perpendicularly to the surface of the mounting portion respectively, and hooked engaging portions are provided on the forward ends of the pair of side portions respectively. According to this structure, the cleaning component can be easily mounted on the ink cartridge by engaging the hooked engaging portions provided on the forward ends of the side portions with the coupling portions of the ink cartridge.

In the aforementioned structure provided with the cleaning component having the mounting portion including the hooked engaging portions, the distance between opposite portions of the pair of hooked engaging portions is preferably smaller than the width of the coupling portion closer to the ink cartridge insertional forward end, and the hooked engaging portions are preferably rendered elastically deformable. According to this structure, the hooked engaging portions can be easily engaged with the coupling portions of the ink cartridge by elastically deforming the hooked engaging portions.

In the aforementioned structure provided with the cleaning component including the mounting portion having the side portions, the width of the coupling portion closer to the ink cartridge insertional forward end is preferably substantially identical to the distance between opposite inner side surfaces of both sides of the mounting portion. According to this structure, the cleaning component can be inhibited from jolting with respect to the ink cartridge in the short-side direction (cross direction) of the coupling portions.

In the aforementioned structure provided with the cleaning component including the mounting portion having the hooked engaging portions, the thickness of the coupling portion closer to the ink cartridge insertional forward end in the range provided with the recess portion is preferably substantially identical to the distance between the pair of hooked engaging portions and the bottom surface of the mounting portion. According to this structure, the cleaning component can be inhibited from jolting with respect to the ink cartridge in the thickness direction of the coupling portions.

In the aforementioned print head cleaning member according to the second aspect, the longitudinal length of the recess portion of the coupling portion closer to the ink cartridge insertional forward end is preferably substantially identical to the longitudinal length of the mounting portion of the cleaning component in plan view. According to this structure, the cleaning component can be inhibited from displacement with respect to the ink cartridge in the longitudinal direction of the coupling portions.

In the aforementioned print head cleaning member according to the second aspect, the mounting portion of the cleaning component is preferably made of resin. According to this structure, the pair of hooked engaging portions of the mounting portions made of resin can be easily elastically deformed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is described with reference to the drawings.

Figure 1:
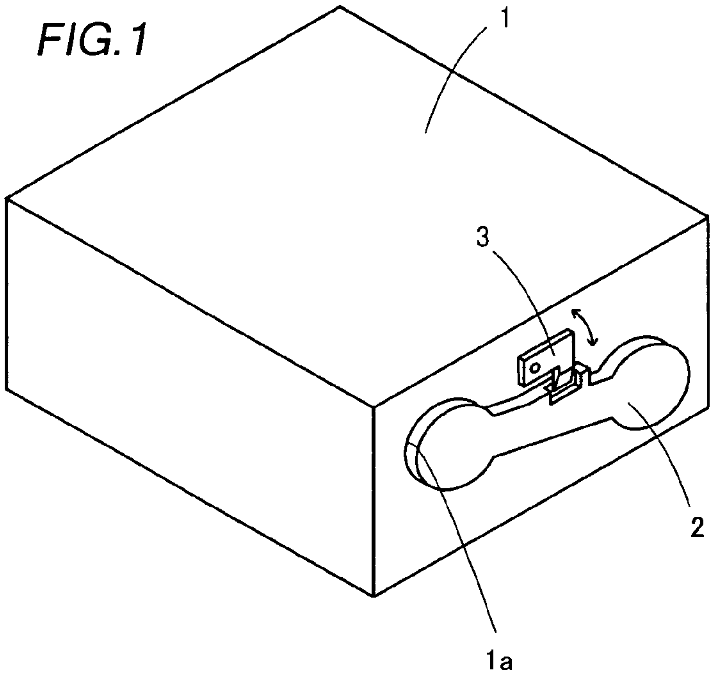
FIG. 1 is a perspective view showing the overall structure of a thermal transfer printer according to an embodiment of the present invention.
Figure 2:
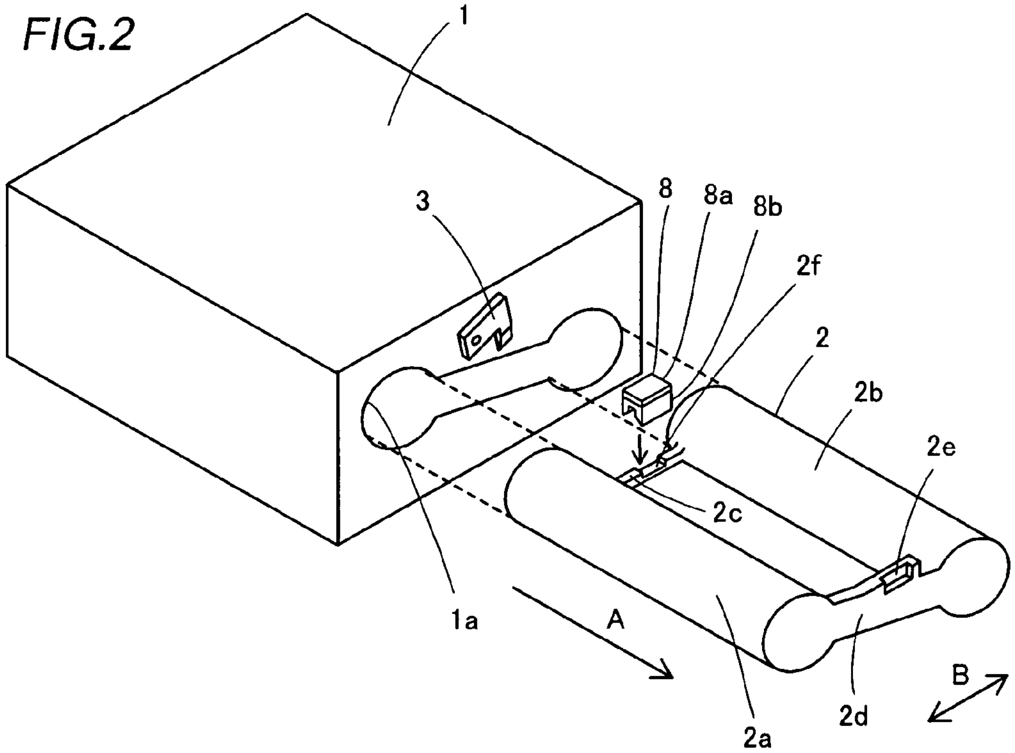
FIG. 2 is a perspective view for illustrating the overall structure of a print head cleaning member according to the embodiment of the present invention.
Figure 7:
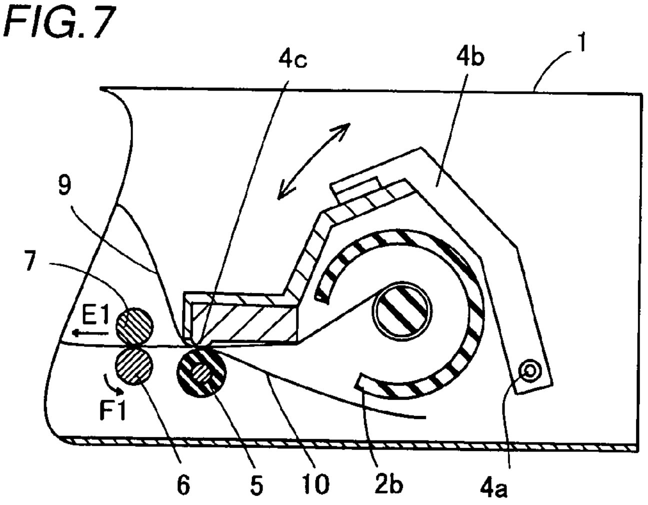
FIG. 7 is a sectional view for illustrating a printing state of the thermal transfer printer according to the embodiment of the present invention.

FIG. 1 is a perspective view showing the overall structure of a thermal transfer printer according to the embodiment of the present invention. FIG. 2 is a perspective view for illustrating the overall structure of a print head cleaning member according to the embodiment of the present invention. FIGS. 3 to 6 are diagrams for illustrating the detailed structure of the print head cleaning member according to the embodiment shown in FIG. 2. FIG. 7 is a sectional view for illustrating a printing state of the thermal transfer printer according to the embodiment of the present invention. The structure of the print head cleaning member according to the embodiment of the present invention is described with reference to FIGS. 1 to 7.

In the thermal transfer printer according to the embodiment of the present invention, a spent ink cartridge 2 is inserted into an ink cartridge receiving hole 1*a* provided on a side portion of a printer body 1, as shown in FIG. 1. An engaging member 3 is provided on the side portion of the printer body 1 for fixing the ink cartridge 2 inserted into the ink cartridge receiving hole 1*a*. The ink cartridge 2 includes a pair of ink ribbon storage portions 2*a* and 2*b* each storing an ink ribbon (ink sheet) 9 (see FIG. 7), a pair of coupling portions 2*c* and 2*d* for coupling the pair of ink ribbon storage portions 2*a* and 2*b* with each other and a concave engaging portion 2*e* provided on the coupling portion 2*d* for engaging with the engaging member 3.

Figure 3:
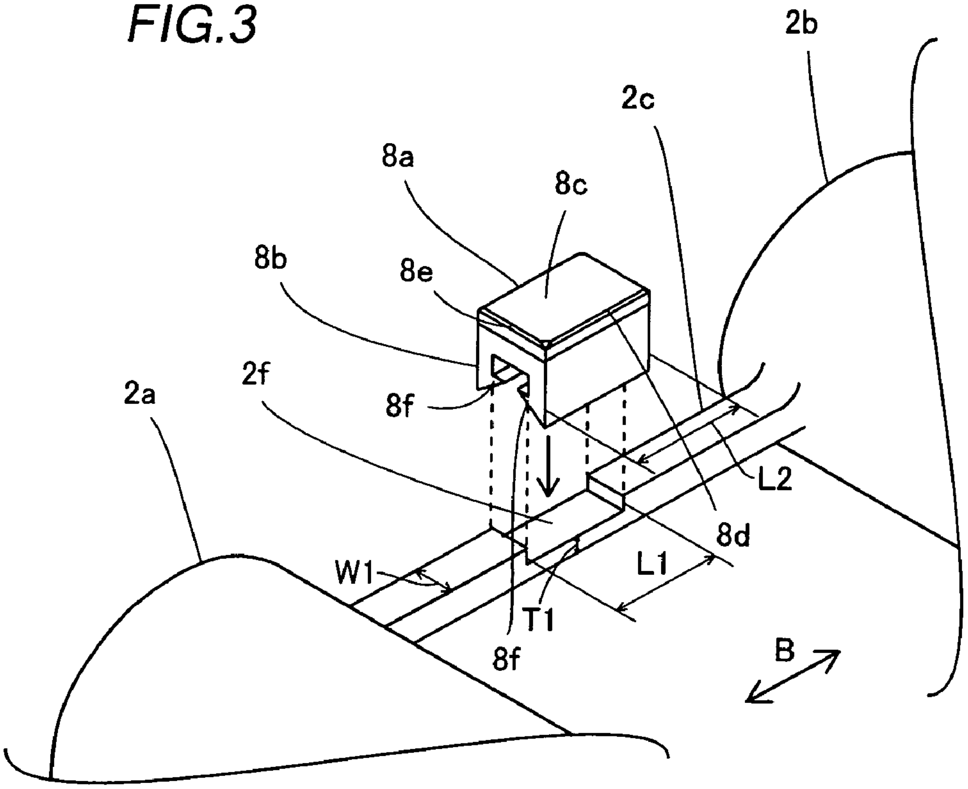
FIG. 3 is a perspective view for illustrating the detailed structure of the print head cleaning member according to the embodiment shown in FIG. 2.

According to this embodiment, a recess portion 2*f* to be mounted with a cleaning component 8 is provided on the coupling portion 2*c* closer to an insertional forward end of the ink cartridge 2, as shown in FIGS. 2 and 3. This coupling portion 2*c* closer to the insertional forward end of the ink cartridge 2 has a width W1 (see FIG. 6). Further, the coupling portion 2*c* closer to the insertional forward end of the ink cartridge 2 has a thickness T1 (see FIG. 6) in the range formed with the recess portion 2*f*. The recess portion 2*f* has a longitudinal length L1 (see FIG. 3) in plan view. According to this embodiment, the spent ink cartridge 2 is used as a guide portion for the cleaning component 8.

The printer body 1 is provided therein with a thermal head (print head) 4 for printing, a platen roller 5 opposed to the thermal head 4, a feed roller 6 for carrying a paper 10 and a press roller 7 pressed against the feed roller 6 with prescribed pressing force, as shown in FIG. 7. The thermal head 4 has a support shaft 4*a*, an arm 4*b* and a print head 4*c*. The thermal head 4 is mounted on the printer body 1 to be rotatable about the support shaft 4*a*.

Figure 4:
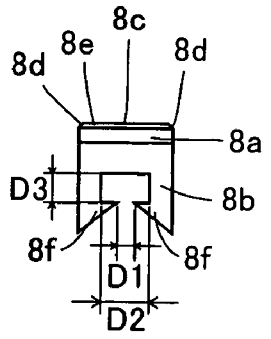
FIG. 4 is a side elevational view of the print head cleaning member according to the embodiment of the present invention.
Figure 5:
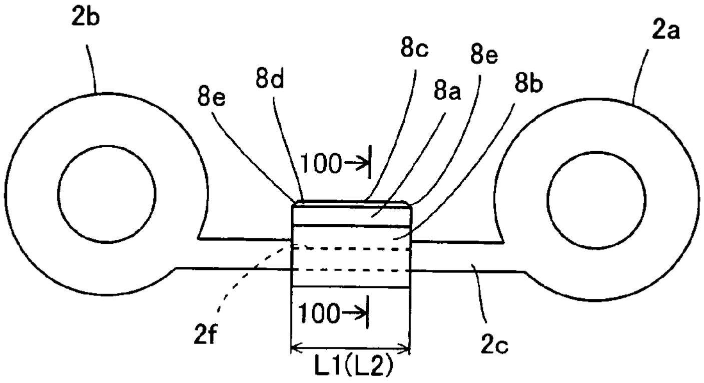
FIG. 5 is a back elevational view showing the print head cleaning member according to the embodiment of the present invention mounted on an ink cartridge.
Figure 6:
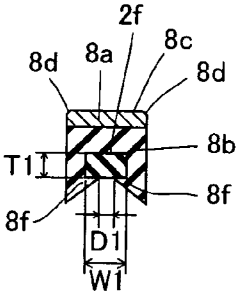
FIG. 6 is a sectional view taken along the line 100-100 in FIG. 5.

According to this embodiment, the cleaning member is constituted of the spent ink cartridge 2 and the cleaning component 8. The cleaning component 8 has a longitudinal length L2 (see FIG. 3) in plan view. This length L2 (see FIG. 3) is substantially identical to the length L1 (see FIG. 3) of the recess portion 2*f*. Therefore, the cleaning component 8 is not displaced along arrow B, whereby the recess portion 2*f* functions also as a locating portion for the mounting position of the cleaning component 8. The cleaning component 8 has a cleaning portion 8*a* of felt or the like and a mounting portion 8*b* of resin. On a contact surface 8*c* of the cleaning portion 8*a* coming into contact with the print head 4*c*, chamfers 8*d* and 8*e* are provided on ends of in the insertional direction for the ink cartridge 2 and ends in a direction perpendicular to the insertional direction respectively, as shown in FIGS. 3 and 4. Another surface of the cleaning portion 8*a* opposite to the contact surface 8*c* is mounted on the mounting portion 8*b* of resin with a double-faced adhesive tape or the like. The mounting portion 8*b* is U-shaped, as shown in FIG. 4. More specifically, the mounting portion 8*b* has a pair of side portions downwardly extending from both ends thereof perpendicularly to the surface of the mounting portion 8*b*. A pair of elastically deformable hooked engaging portions 8*f* engageable with the recess portion 2*f* of the ink cartridge 2 are provided on the forward ends of the side portions respectively. The distance D1 (see FIG. 4) between opposite portions of the pair of hooked engaging portions 8*f* is rendered smaller than the width W1 (see FIG. 6) of the coupling portion 2*c* of the ink cartridge 2. On the other hand, the distance D2 (see FIG. 4) between opposite inner side surfaces of the side portions of the mounting portion 8*b* is rendered substantially identical to the width W1 (see FIG. 6) of the coupling portion 2*c* of the ink cartridge 2. Further, the distance D3 (see FIG. 4) between the pair of hooked engaging portions 8*f* and the bottom surface of the mounting portion 8*b* is rendered substantially identical to the thickness T1 (see FIG. 6) of the coupling portion 2*c* of the ink cartridge 2 in the range formed with the recess portion 2*f*. Therefore, the cleaning component 8 can be detachably mounted on the ink cartridge 2 with the pair of elastically deformable hooked engaging portions 8*f*.

Figure 8:
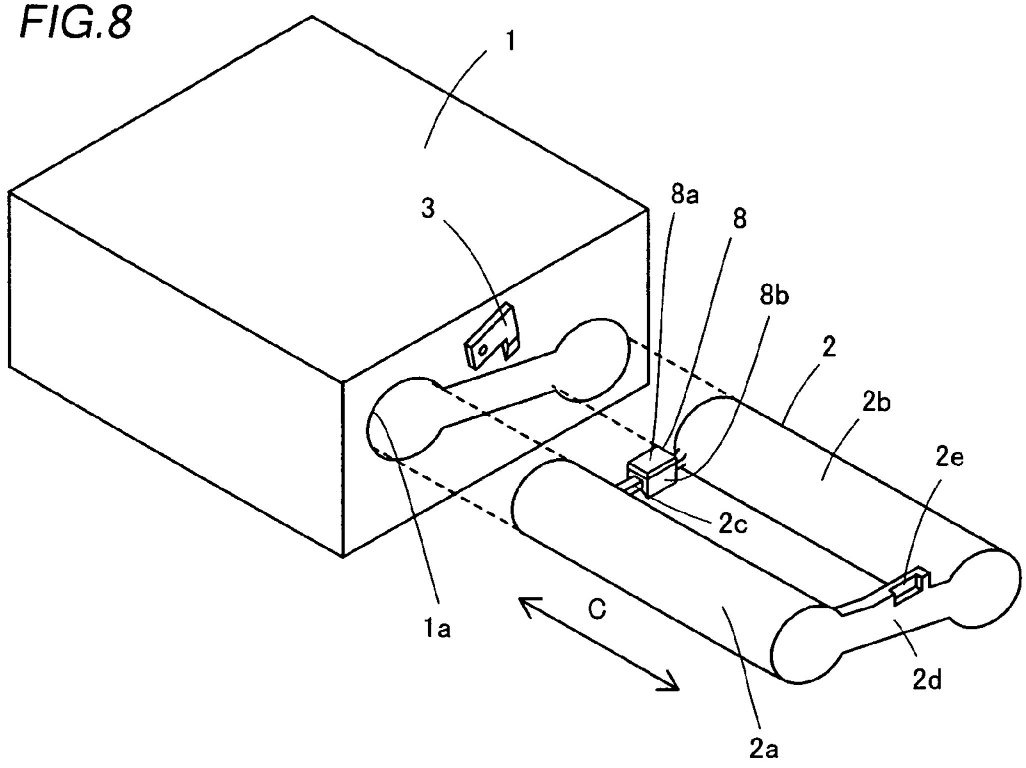
FIGS. 8 and 9 are diagrams for illustrating a print head cleaning operation with the print head cleaning member according to the embodiment of the present invention.
Figure 9:
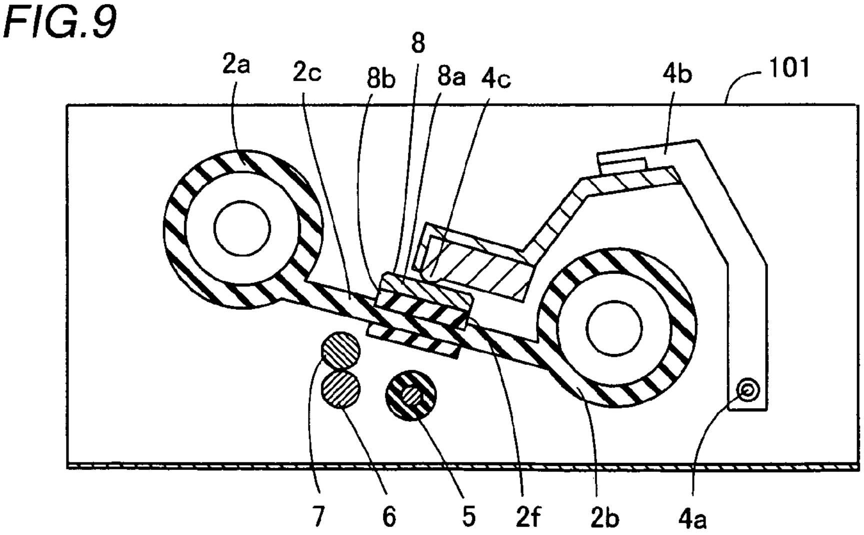
Figure 10:
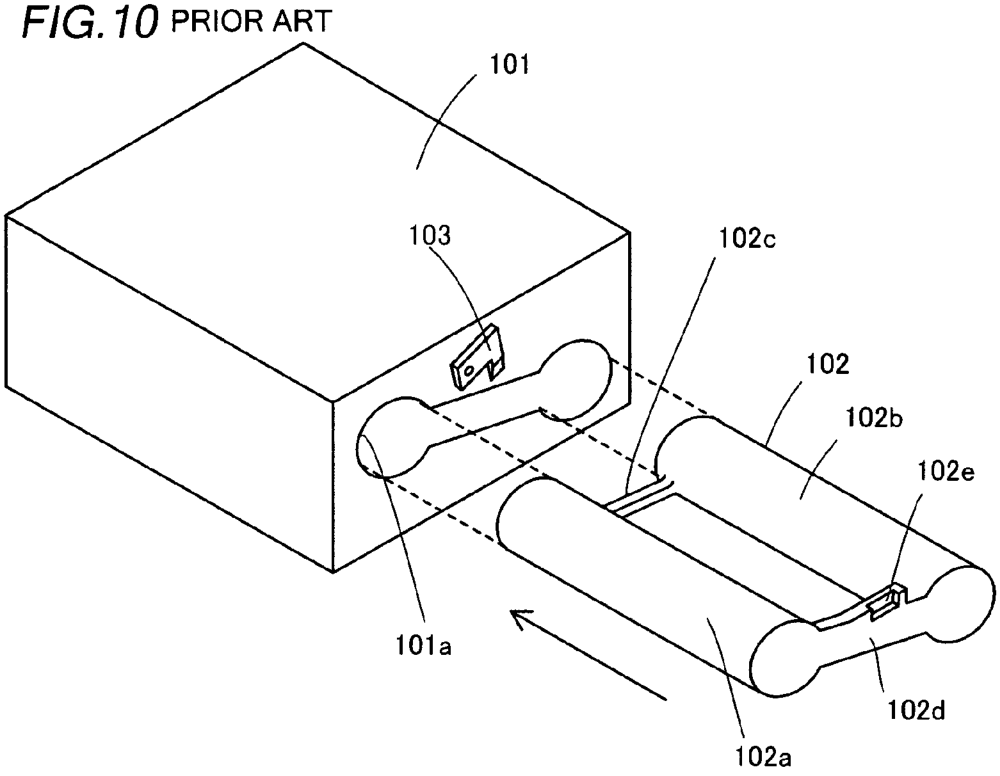
FIG. 10 PRIOR ART
FIG. 10 is a perspective view showing the overall structure of an exemplary conventional thermal transfer printer.
Figure 11:
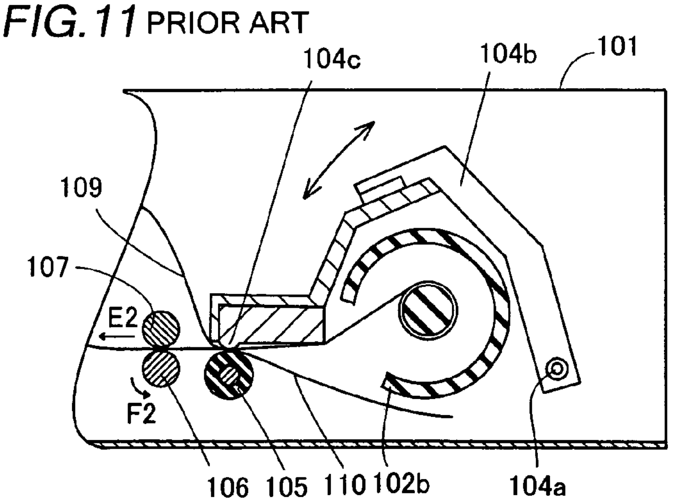
FIG. 11 PRIOR ART
FIG. 11 is a sectional view showing the exemplary conventional thermal transfer printer in a printing state.
Figure 12:
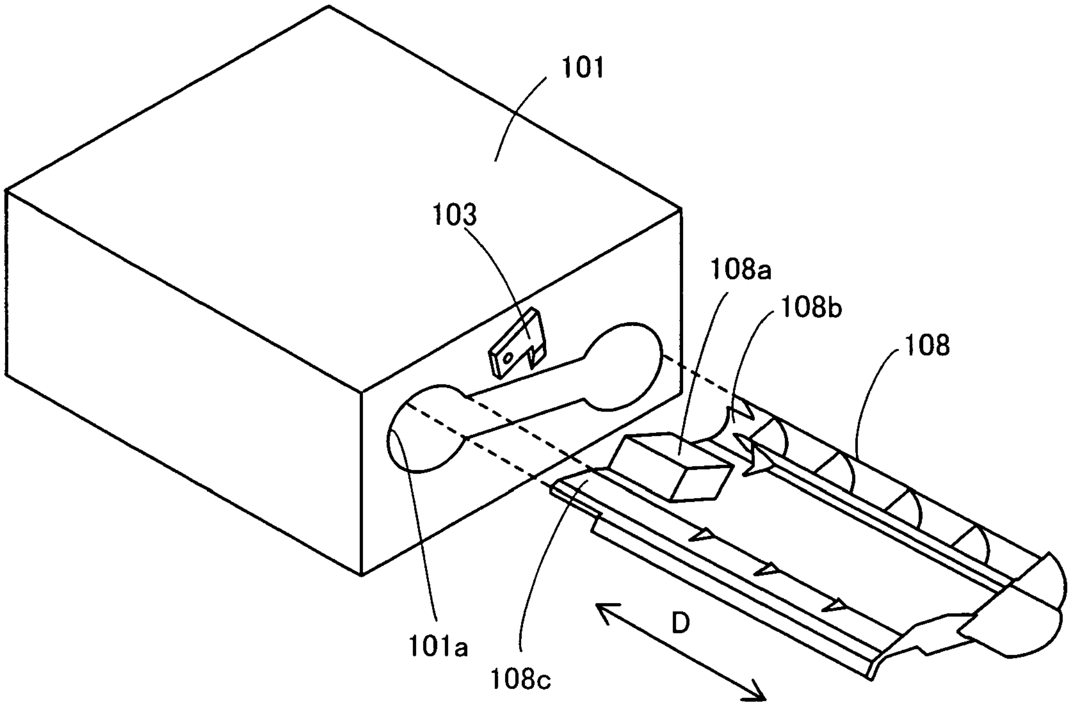
FIG. 12 PRIOR ART
FIG. 12 is a perspective view for illustrating the overall structure of a print head cleaning component of the exemplary conventional thermal transfer printer.
Figure 13:
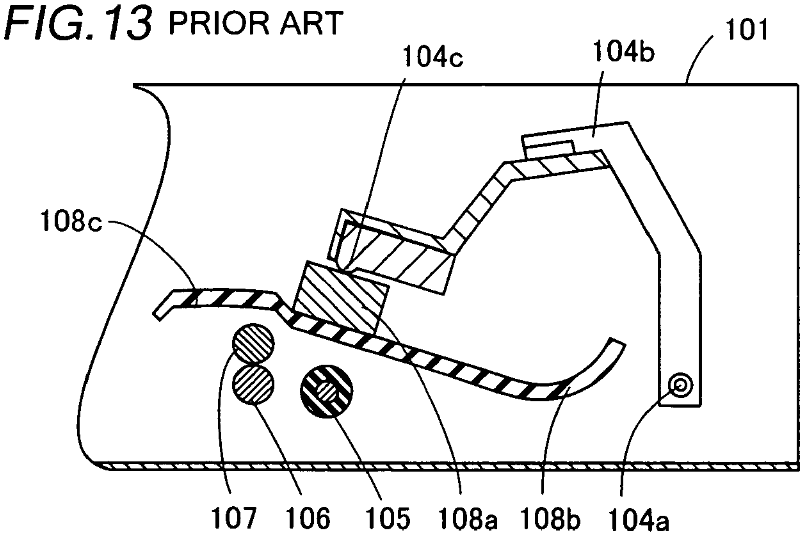
FIG. 13 PRIOR ART
FIG. 13 is a sectional view showing the exemplary conventional thermal transfer printer in a print head cleaning state.

FIGS. 8 and 9 are diagrams for illustrating a print head cleaning operation with the cleaning member according to the embodiment of the present invention. The print head cleaning operation with the cleaning member according to the embodiment of the present invention is now described with reference to FIGS. 2, 3, 5, 6, 8 and 9. In order to clean the print head 4*c* according to this embodiment, the spent ink cartridge 2 is extracted from the printer body 1 along arrow A, as shown in FIG. 2. Thereafter the cleaning component 8 is mounted on the recess portion 2*f* of the ink cartridge 2 as shown in FIGS. 2 and 3, thereby implementing the state shown in FIGS. 5, 6 and 8. The ink cartridge 2 mounted with the cleaning component 8 is inserted into the ink cartridge receiving hole 1*a* of the printer body 1, thereby bringing the cleaning portion 8*a* into contact with the print head 4*c* through the ink cartridge 2 serving as a guide, as shown in FIG. 9. Then, the ink cartridge 2 is reciprocated along arrow C in FIG. 8 in the state shown in FIG. 9, thereby wiping off foreign matter adhering to the print head 4*c* with the cleaning portion 8*a*. According to this embodiment, the print head 4*d* is cleaned in this manner.

A print operation of the thermal transfer printer according to the embodiment of the present invention is described with reference to FIG. 7. The feed roller 6 rotates along arrow F1 in FIG. 7, thereby carrying the paper 10 in a paper carrying direction (along arrow F1 in FIG. 7). At this time, the ink ribbon 9 is fed from the ink ribbon storage portion 2*b* of the ink cartridge 2. The thermal transfer printer presses the print head 4*c* against the platen roller 5 through the paper 10 and the ink ribbon 9 while carrying the paper 10 and the ink ribbon 9, thereby performing printing.

According to this embodiment, as hereinabove described, the spent ink cartridge 2 is so used as the guide portion for bringing the cleaning component 8 into contact with the print head 4*c* that no guide portion may be provided on the cleaning component 8, whereby the cleaning component 8 can be simplified in structure and downsized. Further, the spent ink cartridge 2 can be recycled through the use as the guide portion, and the number of components can be reduced.

According to this embodiment, the cleaning component 8 includes the mounting portion 8*b* for mounting the same on the spent ink cartridge 2 and the cleaning portion 8*a* for cleaning the print head 4*c* so that the mounting portion 8*b* is provided independently of the cleaning portion 8*a* of felt or the like, whereby the cleaning portion 8*a* can be easily mounted on the ink cartridge 2 through the mounting portion 8*b*.

According to this embodiment, the chamfers 8*d* are so provided on the ends of the contact surface 8*c* of the cleaning portion 8_a_ in the insertional direction for the ink cartridge 2 that both ends of the contact surface 8_c_ of the cleaning portion 8_a_ in the insertional direction for the ink cartridge 2 can be prevented from being caught on the print head 4_c_ when the cleaning member is inserted into or extracted from the thermal transfer printer, whereby the contact surface 8_c_ of the cleaning portion 8_a_ can be more smoothly brought into contact with the print head 4_c_.

According to this embodiment, the recess portion 2_f_ mounted with the cleaning component 8 for locating the mounting position of the cleaning component 8 is so provided on the ink cartridge 2 that displacement of the mounting position can be suppressed by the recess portion 2_f_. Further, the cleaning component 8 detachable from the recess portion 2_f_ of the ink cartridge 2 can be exchanged as a consumable part.

According to this embodiment, the mounting portion 8_b_ of the cleaning component 8 is provided with the pair of side portions downwardly extending from both ends thereof perpendicularly to the surface of the mounting portion 8_b_ respectively while the hooked engaging portions 8_f_ are provided on the forward ends of the pair of side portions respectively, whereby the cleaning component 8 can be easily mounted on the ink cartridge 2 by engaging the hooked engaging portions 8_f_ provided on the forward ends of the side portions with the coupling portion 2_c_ of the ink cartridge 2.

According to this embodiment, the distance D1 between the opposite portions of the pair of hooked engaging portions 8_f_ is rendered smaller than the width W1 of the coupling portion 2_c_ of the ink cartridge 2 while the hooked engaging portions 8_f_ are rendered elastically deformable, whereby the hooked engaging portions 8_f_ can be easily engaged with the coupling portion 2_c_ of the ink cartridge 2 by elastically deforming the hooked engaging portions 8_f_.

According to this embodiment, the width W1 of the coupling portion 2_c_ of the ink cartridge 2 is rendered substantially identical to the distance D2 between the opposite inner side surfaces of both side portions of the mounting portion 8_b_, whereby the cleaning component 8 can be inhibited from jolting with respect to the ink cartridge 2 in the short-side direction (cross direction) of the coupling portion 2_c_.

According to this embodiment, the thickness T1 of the coupling portion 2_c_ of the ink cartridge 2 in the range formed with the recess portion 2_f_ is rendered substantially identical to the distance D3 between the pair of hooked engaging portions 8_f_ and the bottom surface of the mounting portion 8_b_, whereby the cleaning component 8 can be inhibited from jolting with respect to the ink cartridge 2 in the thickness direction of the coupling portion 2_c_.

According to this embodiment, the longitudinal length L1 of the recess portion 2_f_ of the coupling potion 2_c_ of the ink cartridge 2 is rendered substantially identical to the longitudinal length L2 of the cleaning component 8 in plan view, whereby the cleaning component 8 can be inhibited from displacement with respect to the ink cartridge 2 along arrow B.

According to this embodiment, the mounting portion 8_b_ of the cleaning component 8 of resin is so employed that the hooked engaging portions 8_f_ of the mounting portion 8_b_ are made of resin, whereby the pair of hooked engaging portions 8_f_ can be easily elastically deformed.

Although the present invention has been described and illustrated in detail, it is clearly understood that the same is by way of illustration and example only and is not to be taken by way of limitation, the spirit and scope of the present invention being limited only by the terms of the appended claims.

For example, while the aforementioned embodiment is applied to the cleaning member for the print head of the thermal transfer printer as an exemplary image generating apparatus, the present invention is not restricted to this but is also applicable to a cleaning member for a print head of another image generating apparatus other than the thermal transfer printer, so far as the image generating apparatus has the print head for printing.

While the cleaning component is detachably mounted on the ink cartridge in the aforementioned embodiment, the present invention is not restricted to this but the cleaning component may alternatively be undetachably fixed to the ink cartridge with a double-faced adhesive tape or the like.

What is claimed is:

1. A print head cleaning member comprising:

a spent ink cartridge; and a cleaning component detachably mounted on said spent ink cartridge for cleaning a print head, wherein said spent ink cartridge is used as a guide portion for bringing said cleaning component into contact with said print head, said cleaning component includes:

a mounting portion for mounting said cleaning component on said spent ink cartridge, and a cleaning portion mounted on said mounting portion for cleaning said print head by coming into contact with said print head, said cleaning portion includes a chamfer provided on at least an ink cartridge insertional end of a contact surface of said cleaning portion, and said chamfer is constituted by an inclined surface, extending in a direction perpendicular to an insertional direction of said spent ink cartridge, of said cleaning portion.

2. The print head cleaning member according to claim 1, wherein said chamfer is provided on each ink cartridge insertional end of said contact surface of said cleaning portion.

3. The print head cleaning member according to claim 1, wherein said spent ink cartridge includes a pair of ink sheet storage portions, a pair of coupling portions coupling said pair of ink sheet storage portions with each other and a recess portion provided on one of said pair of coupling portions closer to an ink cartridge insertional forward end and mounted with said cleaning component for locating a mounting position, and said cleaning component is detachably mounted on said recess portion.

4. The print head cleaning member according to claim 3, wherein the longitudinal length of said recess portion of said coupling portion closer to said ink cartridge insertional forward end is substantially identical to the longitudinal length of said mounting portion of said cleaning component in plan view.

5. The print head cleaning member according to claim 1, wherein said mounting portion of said cleaning component has a pair of side portions extending from both ends of said mounting portion perpendicularly to the surface of said mounting portion respectively, and hooked engaging portions are provided on the forward ends of said pair of side portions respectively.

6. The print head cleaning member according to claim 5, wherein said spent ink cartridge includes a pair of ink sheet storage portions and a pair of coupling portions coupling said pair of ink sheet storage portions with each other, and the distance between opposite portions of said pair of hooked engaging portions is smaller than the width of said coupling portion closer to an ink cartridge insertional forward end, and said hooked engaging portions are rendered elastically deformable.

7. The print head cleaning member according to claim 5, wherein said spent ink cartridge includes a pair of ink sheet storage portions and a pair of coupling portions coupling said pair of ink sheet storage portions with each other, and the width of said coupling portion closer to an ink cartridge insertional forward end is substantially identical to the distance between opposite inner side surfaces of both sides of said mounting portion.

8. The print head cleaning member according to claim 5, wherein said spent ink cartridge includes a pair of ink sheet storage portions, a pair of coupling portions coupling said pair of ink sheet storage portions with each other and a recess portion provided on one of said pair of coupling portions closer to an ink cartridge insertional forward end and mounted with said cleaning component for locating a mounting position, and the thickness of said coupling portion closer to said ink cartridge insertional forward end in the range provided with said recess portion is substantially identical to the distance between said pair of hooked engaging portions and the bottom surface of said mounting portion.

9. The print head cleaning member according to claim 1, wherein said mounting portion of said cleaning component is made of resin.

10. A print head cleaning member comprising:

a spent ink cartridge; and a cleaning component for cleaning a print head, wherein said cleaning component includes:

a mounting portion for mounting said cleaning component on said spent ink cartridge, and a cleaning portion mounted on said mounting portion for cleaning said print head by coming into contact with said print head, said spent ink cartridge is used as a guide portion for bringing said cleaning component into contact with said print head, a chamfer is provided on at least an ink cartridge insertional end of a contact surface of said cleaning portion, said chamfer is constituted by an inclined surface, extending in a direction perpendicular to an insertional direction of said spent ink cartridge, of said cleaning portion, said spent ink cartridge includes a pair of ink sheet storage portions, a pair of coupling portions coupling said pair of ink sheet storage portions with each other and a recess portion provided on one of said pair of coupling portions closer to an ink cartridge insertional forward end and mounted with said cleaning component for locating a mounting position, and said cleaning component is detachably mounted on said recess portion.

11. The print head cleaning member according to claim 10, wherein said chamfer is provided on each ink cartridge insertional end of said contact surface of said cleaning portion.

12. The print head cleaning member according to claim 10, wherein said mounting portion of said cleaning component has a pair of side portions extending from both ends of said mounting portion perpendicularly to the surface of said mounting portion respectively, and hooked engaging portions are provided on the forward ends of said pair of side portions respectively.

13. The print head cleaning member according to claim 12, wherein the distance between opposite portions of said pair of hooked engaging portions is smaller than the width of said coupling portion closer to said ink cartridge insertional forward end, and said hooked engaging portions are rendered elastically deformable.

14. The print head cleaning member according to claim 12, wherein the width of said coupling portion closer to said ink cartridge insertional forward end is substantially identical to the distance between opposite inner side surfaces of both sides of said mounting portion.

15. The print head cleaning member according to claim 12, wherein the thickness of said coupling portion closer to said ink cartridge insertional forward end in the range provided with said recess portion is substantially identical to the distance between said pair of hooked engaging portions and the bottom surface of said mounting portion.

16. The print head cleaning member according to claim 10, wherein the longitudinal length of said recess portion of said coupling portion closer to said ink cartridge insertional forward end is substantially identical to the longitudinal length of said mounting portion of said cleaning component in plan view.

17. The print head cleaning member according to claim 10, wherein said mounting portion of said cleaning component is made of resin.

* * * * *